United States Patent [19]

Singleton et al.

[11] Patent Number: 5,425,865
[45] Date of Patent: Jun. 20, 1995

[54] POLYMER MEMBRANE

[75] Inventors: Raymond W. Singleton, Cirencester; John A. Cook, Faringdon; Kenneth Gargan, Swindon, all of Great Britain

[73] Assignee: Scimated Limited, Great Britain

[21] Appl. No.: 27,157

[22] PCT Filed: Sep. 19, 1991

[86] PCT No.: PCT/GB91/01604
 § 371 Date: Mar. 4, 1993
 § 102(e) Date: Mar. 4, 1993

[87] PCT Pub. No.: WO92/05595
 PCT Pub. Date: Apr. 2, 1992

[30] Foreign Application Priority Data

Sep. 20, 1990 [GB] United Kingdom ............... 9020580
Jul. 9, 1991 [GB] United Kingdom ............... 9114762

[51] Int. Cl.$^6$ ............. C25B 13/04; C25B 13/08; H01M 6/18; B05D 5/00
[52] U.S. Cl. .................. 204/252; 204/296; 204/157.15; 429/192; 429/249; 521/27; 427/243; 427/244; 427/336; 427/393.5; 427/430.1
[58] Field of Search ........... 204/157.15, 252, 296; 252/182 B, 182.18, 182.29, 182.32, 182.33; 521/27, 28; 429/30, 33, 192, 249, 250, 251, 247, 254; 428/391.7, 341; 427/243, 244, 336, 393.5, 430.1

[56] References Cited

U.S. PATENT DOCUMENTS

| | | | |
|---|---|---|---|
| Re. 31,824 | 2/1985 | D'Agostino et al. | 204/159.17 |
| 2,965,697 | 12/1960 | Duddy | 136/146 |
| 3,376,168 | 2/1968 | Horowitz | 136/146 |
| 3,427,206 | 2/1969 | Scardaville et al. | 429/144 |
| 4,230,463 | 10/1980 | Henis et al. | 55/16 |
| 4,346,142 | 8/1982 | Lazear | 428/315.7 |
| 4,468,441 | 8/1984 | D'Agostino et al. | 429/105 |
| 4,547,411 | 10/1985 | Bachot et al. | 427/393.5 |
| 4,613,544 | 9/1986 | Burleigh | 428/315.5 |
| 4,804,598 | 2/1989 | Jackovitz et al. | 429/254 |

FOREIGN PATENT DOCUMENTS

| | | |
|---|---|---|
| 160473 | 6/1985 | European Pat. Off. . |
| 53-106134 | 8/1978 | Japan . |
| 1039444 | 8/1966 | United Kingdom . |
| 1303897 | 1/1973 | United Kingdom . |
| 1372225 | 10/1974 | United Kingdom . |
| 1449814 | 9/1976 | United Kingdom . |
| 1493654 | 11/1977 | United Kingdom . |
| 1512553 | 6/1978 | United Kingdom . |
| 1538810 | 1/1979 | United Kingdom . |
| 2098628 | 5/1982 | United Kingdom . |
| WO8706395 | 10/1987 | WIPO . |

OTHER PUBLICATIONS

W. H. Philipp et al., "New Ion Exchange Membranes," NASA Technical Memorandum 81670. Oct. 1980.
D'Agostino et al., "Grafted Membranes," Zinc-Silver Oxide Batteries, Wiley and Sons, Inc.; New York, N.Y.; 1971; pp. 271-281.

Primary Examiner—Kathryn Gorgos
Attorney, Agent, or Firm—Lerner, David, Littenberg, Krumholz & Mentlik

[57] ABSTRACT

Composite polymer membranes are disclosed comprising a first polymeric material which defines a porous matrix, and a second polymeric material which at least partially fills, and thereby blocks, the pores of the matrix, and in which preferably each of the first and second materials are crosslinked. The membrane preferably includes a layer of an ethylenically unsaturated carboxylic acid which is graft-polymerized with the first polymeric material of the porous matrix on one of its surfaces. Crosslinking has been found to improve the transport characteristics of species through the membrane, such as the barrier performance of the membrane towards species dissolved in solution.

29 Claims, 1 Drawing Sheet

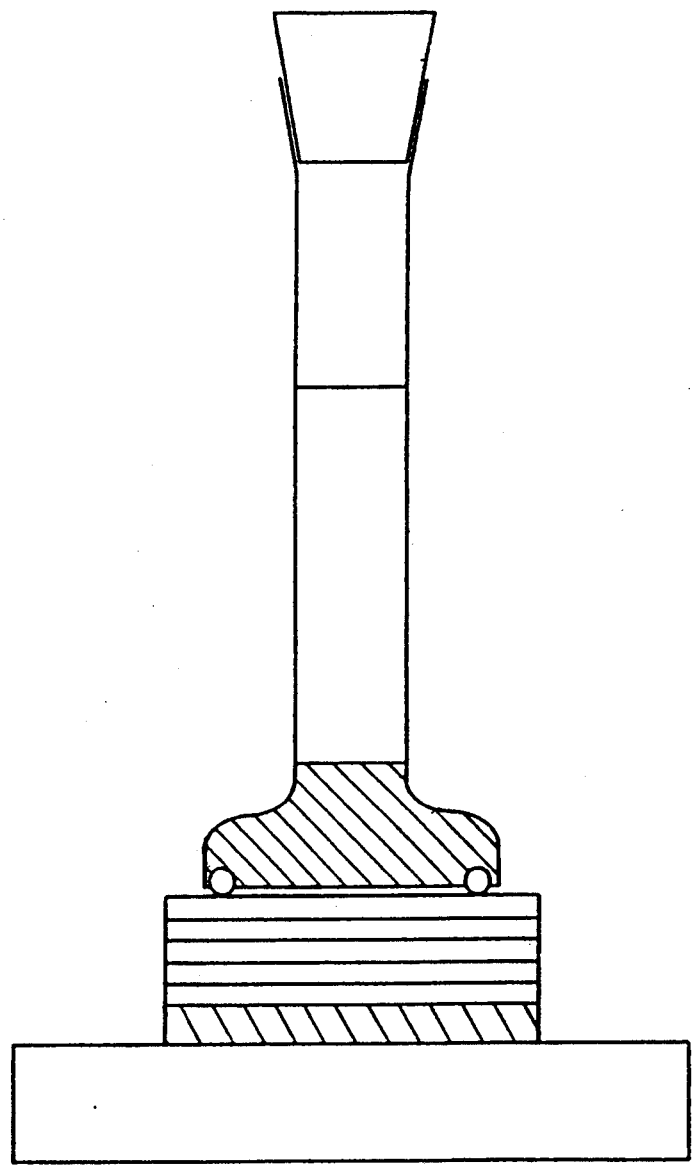

POLYMER MEMBRANE

FIELD OF THE INVENTION

The present invention relates to polymer membranes. The invention relates in particular to a composite polymer membrane, a method of making a composite polymer membrane, and a method of crosslinking the material of a microporous polymer matrix.

BACKGROUND OF THE INVENTION

A composite polymer membrane, which comprises a microporous matrix formed from a first polymeric material and a second polymeric material within the pores of the matrix, can be used as a selective barrier. For example, such a membrane may be used to separate components of a liquid. By use of an ion exchange material as the second polymeric material, such a membrane may be used as a selective barrier for ions in solution; for example, such a membrane may be used as an electrode separator in an electrochemical device, in which ionic conduction between electrodes of the device is required and in which a barrier is required to prevent migration of certain dissolved species (such as ions) and of electrode material in particulate form. The barrier is also required in secondary cells on recharging, when loosely attached material is deposited on the anode, often in the form of dendrites, which is required not to make contact with the cathode. A composite polymer membrane can be used to separate materials by other mechanisms, for example by ultrafiltration.

A suitable composite polymer membrane for use as an electrode separator in an electrochemical device is disclosed in our U.S. Pat. No. 5,256,503 the disclosure of which is incorporated herein by reference thereto. The membrane comprises a porous matrix of polyethylene which has been formed from a blend of polyethylene and polyethylene oxide ;by removal of the polyethylene oxide.

The pores in the matrix contain polyacrylic acid which preferably has been polymerized in situ in the pores, and which blocks, and preferably fills, the pores of the matrix. The acrylic acid is supplied to the pores of the matrix in solution with a crosslinking agent and a photoinitiator. Polymerization and crosslinking of the acrylic acid are initiated by exposure to ultraviolet radiation.

The polymerization and crosslinking reactions of the acrylic acid in the composite membrane disclosed in U.S. Pat. No. 5,256,503 compete for the acrylic acid, and by selecting the relative rates of the competing reactions, it is possible to control the degrees of crosslinking and polymerization of the acrylic acid. It has been found possible to vary the properties of the known membrane by appropriate selection of the crosslink density of the acrylic acid impregnant, for example to provide a membrane with a low resistance and relatively weak barrier performance using a low crosslink density, and to provide a membrane with relatively high resistance and good barrier performance using a high crosslink density. The degree of crosslinking can be selected by for example providing the impregnant with an appropriate quantity of crosslinking agent for reaction. However, a remaining difficulty lies in producing a membrane by the technique disclosed in U.S. Pat. No. 5,256,503 which has a good barrier performance towards certain dissolved species (such as silver or mercury ions).

Another approach to producing a composite polymer membrane is the subject of U.S. Pat. No. 3,427,206, and involves grafting a polymer of an ethylenically unsaturated carboxylic acid such as acrylic acid onto a nonporous sheet of a material such as polyethylene. This approach can be contrasted to that discussed above, in that ion migration takes place through the bulk polymer of the sheet to which acrylic acid has been grafted, rather than through regions of polyacrylic acid contained within pores in a microporous sheets.

Membranes which are formed by grafting an ion exchange material onto the polymeric material of a continuous sheet may be crosslinked, generally before the ion exchange material is supplied. It has been found that crosslinking of such membranes has effects which are similar to those in the membranes disclosed in WO-A-87/06395, affecting ionic conductivity through the membrane and barrier performance. This can be understood since crosslinks are provided in both systems effectively between molecules of ion exchange material, the material in the first system described above being bulk material, whereas that in the second system described above is grafted onto the polymeric material of a continuous sheet.

Polymer membranes of the type disclosed in WO-A-87/06395 which comprises a porous matrix of a first polymeric material, with a second polymeric material within its pores, have been found to have advantages compared with membranes which comprise a continuous sheet of a first polymeric material with a second material grafted to the material of the sheet. For example, the ionic conductivity through a filled microporous sheet has been found to be higher than that through a grafted sheet.

SUMMARY OF THE INVENTION

According to the present invention, it has been found that the performance of certain composite polymer membranes can be improved in significant respects by crosslinking the polymeric material of a microporous matrix, whose pores are blocked by a second material through which conduction takes place, for example by an ion exchange mechanism, or by a mechanism involving ultrafiltration.

Accordingly, in one aspect, the invention provides a composite polymer membrane comprising a first polymeric material which defines a porous matrix, and a second polymeric material which at least partially fills, and thereby blocks, the pores of the matrix, at least the first material, and preferably each of the first and second materials, being crosslinked.

In another aspect, the invention provides a method of making a composite polymer membrane, which comprises:

(a) providing a porous matrix defined by a first polymeric material, which is impregnated with a first reagant which, on exposure to an appropriate treatment, leads to crosslinking of the first polymeric material;

(b) causing the first polymeric material and the first reagant to react so as to crosslink the first polymeric material; and (c) impregnating the porous matrix with a curable second material.

Preferably, the second material is impregnated into the matrix as a component of a mixture, together with a second reagant which, on exposure to an appropriate treatment, leads to curing of the second material. Curing may involve polymerization or crosslinking or, most preferably, both, and the second reagant leads to crosslinking of the second material. It is preferred that the method includes the steps of impregnating the matrix with a mixture of a second material which is polymerizable and a second reagant which, on exposure to an appropriate treatment, leads to crosslinking of the polymerizable material, subsequently causing the second material to polymerize and to react with the second reagant.

It has been found, surprisingly, that crosslinking the first polymeric material of the membrane can influence significantly the transport characteristics of species through the membrane, for example the barrier performance of the membrane towards dissolved species such as certain ions compared with the performance of a membrane in which the performance of a membrane in which the first polymeric material is not crosslinked, as disclosed in WO-A-87/06395. This result is achieved despite the fact that ion migration takes place through regions of the membrane occupied by the second polymeric material rather than the first polymeric material. Particularly significantly, it has been found that such improved barrier performance is obtained without any significant increase in resistance of the membrane to conduction through it of species, for example ions, as had been encountered using the technique disclosed in WO-A-87/06395, for example, as measured as the internal resistance of an electrochemical device in which the membrane is incorporated as an electrode separator. Furthermore, compared with membranes produced by the technique disclosed in U.S. Pat. No. 3,427,206, the membranes of the present invention retain the advantage of those disclosed in WO-A-87/06395 of low resistance to ionic transfer. The invention therefore allows the barrier properties towards certain ionic species and resistance So ionic transfer to be optimised. This in turn can allow the design of an electrochemical cell with a long shelf life.

DETAILED DESCRIPTION

The first polymeric material of the membrane will generally function to provide a support for the second polymeric material. The first polymeric material will therefore generally be an inert material which has suitable physical properties for it to-function as such a support. Examples of suitable materials include polyolefins, especially polyethylene, although other materials such as polyvinyl chloride, polyamides, polyesters, polysulphones and polytetrafluoroethylene may be used.

The matrix provided by the first polymeric material is preferably formed by removal, especially by liquid extraction, of a removable material dispersed therein. Liquid extraction of polyethylene oxide from an article comprising a mixture of polyethylene and polyethylene oxide is a preferred example; other possibilities include the extraction of a soluble salt such as lithium carbonate from a mixture of polyethylene and the salt, for example using an acid such as nitric acid or hydrochloric acid, (as disclosed in EP-A-219190), extraction of polyvinylacetate from a sheet provided by a mixture of polyvinylacetate and polyvinyl chloride, and extraction of ethylene/vinylacetate copolymer from a mixture of ethylene/vinylacetate polymer and polypropylene.

An advantage of forming the microporous matrix using an extract method is that the pores of the resulting structure are highly tortuous, more so than those of pores produced by stretching or perforation techniques. It is thought that a highly tortuous structure helps to retain volatile polymerizable materials such as acrylic acids in the pores of the structure until polymerization is effected.

However, the matrix of the membrane should be microporous in the sense that details of its structure are discernable only by microscopic examination. It is particularly preferred that the structure of the pores is so fine that it can only be discerned by use of election microscopy techniques, which can resolve details of structure below 5 micrometers.

It will be understood that when the term microporous is used to describe the matrix defined by the first polymeric material, the term is applicable to a component of a membrane which consists of interpenetrating phases, as might be the case for a membrane derived from a mixture of two components.

Preferably, the volume of the pores in the matrix defined by the first polymeric material is at least about 10%, or preferably at least about 30% in order to achieve satisfactory ionic conductivity. A pore volume of at least 70% or even higher can be preferred for many applications.

The thickness of the membrane is preferably less than about 250 $\mu$m, more preferably less than about 200 $\mu$m especially less than about 100 $\mu$m. It is also preferred that material of the membrane which is to react by crosslinking is less than about 200 $\mu$m from the or a surface of the membrane which is exposed to the medium by which the crosslinking reaction is initiated, more preferably less than about 150 $\mu$m from that surface, especially less than about 100 $\mu$m from that surface.

The second material of the membrane is selected according to the intended end use of the membrane. The second material may be supplied to the membrane as a monomer and, for many applications, will then be polymerized in situ, after it has been impregnated into the membrane. Preferred materials which may be used include a vinyl monomers capable of reacting with an acid or a base to form a salt, either directly or indirectly after appropriate work up, perhaps involving for example hydrolysis or sulphation. Especially preferred materials include ethylenically unsaturated acids and their esters such as acrylic acid, methacrylic acid, ethyl acrylate and methyl acrylate, maleic acid, maleic anhydride, acrylamide, monomethyl acrylamide and N,N,-dimethyl acrylamide, vinyl acetate, and vinyl pyridines such as 2-vinylpyridine, 2-methyl-5-vinylpyridine and 2-vinyl-5-ethylpyridine. It is particularly preferred to supply the second material to the pores of the matrix defined by the first material in monomer form for subsequent polymerization in situ since it allows certain second materials to be introduced in liquid form to be converted subsequently into a solid form by polymerization. It is envisaged that the second material might be supplied to the matrix in solution in polymeric form. The solvent may then be removed, and the resulting polymeric impregnant may then be crosslinked if desired.

The second material, together with an appropriate reagant as an initiator or a crosslinking agent or both when present, may be introduced into the pores of the matrix defined by the first polymeric material in solution. It is, however, desirable to use a solution of the second material which polymerizes and is crosslinked at an acceptable rate without an unacceptable phase separation of the solution. For example, a solution consisting of the following could be used (percentages given by weight):

| | |
|---|---|
| acrylic acid (reactive monomer) | 60–95% |
| crosslinking agent | 0.5–25% |
| photoinitiator | 0.1–5% |
| water up to about | 60% |

It is envisaged that the second material might be supplied to the matrix in solution in polymeric form. The solvent may then be removed, and the resulting polymeric impregnant may then be crosslinked if desired. Other components may be added to the solution such as a surfactant for compatibility or a base to neutralize (at least partially) the acrylic acid.

When the second material is polymerized in situ, and is crosslinked using a crosslinking agent, polymerization and crosslinking reactions can compete for monomeric second material. The density of crosslinks can be adjusted to suit a particular application by selecting a crosslinking agent with an appropriate activity towards the monomeric second material compared with the reactivity of that material in polymerization reaction. More preferably, the crosslink density is adjusted mixture of the second material and the crosslinking agent in appropriate proportions. The concentration of reaction initiator such as a photo initiator can affect the relative rates of competing reactions and, therefore, also the crosslink density. Examples of suitable crosslinking agents include triallyl isocyanurate (TAIC), triallyl cyanurate (TAC), 1,5-hexadiene-3-ol, 2,5-dimethyl-1,5-hexadiene, 1,5-hexadiene, 1,7-octadiene, 3,7-dimethyl-2,6-octadiene-1-ol, and certain diacrylates such as polyethylene glycol diacrylate and dimethacrylate. A particularly preferred crosslinking agent for the second material is divinylbenzene.

Generally, the pores of the matrix will the blocked over substantially the entire area of the membrane. For optimum barrier properties, it is preferred that at least 20% of the volume of the pores which are blocked be filled by the second polymeric material, more preferably at least about 75%, especially at least about 95%. It is particularly preferred that the pores be substantially filled with the second polymeric material, it being understood that this does not require the exposed surface of the second material in the pores to be exactly in line with the main surface of the membrane, and the degree of filling may vary somewhat depending on the Shape, size, and tortuosity of the pores.

The reagant which is supplied for crosslinking the first polymeric material may be provided at the the at which the matrix is formed from that material, for example by forming the matrix from a blend of the first material and the first reagant.

Preferably, one or both of the steps of crosslinking the two component materials of the membrane is initiated by irradiation. Suitable radiation might include, for example, gamma radiation such as from a $Co^{60}$ source or electron bombardment, but it is strongly preferred that ultraviolet radiation be used because of its low cost and of the convenience with which it can be used. When irradiation is used to initiate crosslinking of one or both of the materials, appropriate initiators will be used to initiate the reaction. When ultraviolet radiation is used to initiate crosslinking, a suitable initiator might be acetophenone or benzophenone.

The use of ultraviolet radiation to initiate crosslinking has the advantage that it can easily be carried out as a continuous process without having to erect elaborate shields for safety reasons. Furthermore, the use of ultraviolet radiation to initiate crosslinking has been found in many cases to result in a faster reaction than when other radiation sources are used. Moreover, the use of ultraviolet reaction has the advantage that it allows the crosslinking reaction to be controlled accurately to give a desired degree of crosslinking.

When ultraviolet radiation is used to initiate crosslinking of a polyolefin microporous matrix, a photoinitiator is selected which is capable of abstracting a hydrogen atom from the polyolefin molecules. Suitable photoinitiators will generally be aromatic compounds which contain carbonyl groups, such as acetophenone, benzophenone, 4-chlorobenzophenone and 4,4'-dimethyl benzophenone.

Preferably, the reagant which is supplied for crosslinking the first polymeric material is provided in solution. More preferably, it is provided in solution in a solvent which neither dissolves the first polymeric material nor causes it to swell.

Accordingly, in a further aspect, the invention provides a method of a method of crosslinking the polymeric material of a microporous matrix, the material comprising a polyolefin which comprises:

(a) impregnating the matrix with a solution of a reagant which, on exposure to an appropriate treatment leads to crosslinking of the material;

(b) removing the solvent in which the reagant is dissolved by volatilizing it; and (c) treating the reagant to cause crosslinking of the material.

The degree of crosslinking of a polymeric material can be expressed in terms of its gel content, as measured according to ASTM D2765-84. It has been found that the barrier performance of a composite polymer membrane is dependent on the degree of crosslinking of the first polymeric material; preferably, that material is crosslinked to give a gel content of at least about 50% more preferably at least about 60% for optimum barrier properties.

Suitable solvents for the reagant including acetone, toluene, methanol, butanone and 2-methoxyethanol. Preferably, the solvent in which the reagant is provided is inert towards the crosslinking agent, in particular having no abstractable hydrogen atoms.

For many applications, it can be preferred that the membrane include a layer of a vinyl monomer capable of reacting with an acid or a base to form a salt directly or indirectly, which is graft polymerized with the first polymeric material of the porous matrix. The provision of a layer of this kind has the advantage that the membrane can be wet more easily by an aqueous liquid, in particular an aqueous electrolyte, than is possible otherwise. This has the advantage that a membrane can be wet by such an electrolyte more quickly and more thoroughly so that the resistance to ionic migration through the membrane becomes stable quickly and at an advantageously low value. The vinyl monomer may comprise an ethylenically unsaturated carboxylic acid or an ester thereof. Preferably, the second polymeric material in the pores of the matrix and the vinyl monomer on the surface of the matrix are derived from the same monomer material.

In yet another aspect, the invention provides an electrochemical device which comprises an anode, a cathode, a liquid electrolyte, and an electrode separator comprising a composite polymer membrane of the type discussed above.

Other uses for the composite membrane of the invention include those in which filtration, separation, or concentration are to be achieved.

Further information concerning the methods of the invention and materials on which they can be practiced is given below:

Formation of Microporous Matrix

The microporous matrix on which the invention is practiced in the following examples comprises polyethylene and was formed using the technique disclosed in EP-A-219190. Briefly, that technique involves mixing the polyethylene with particles of a soluble particulate salt and a plasticizer, forming a film from the mixture, stretching the film and removing the salt.

A suitable matrix has a porosity of 50 to 53%, a thickness of 40 μm, and an air flow rate of 60 cm$^3$.min$^{-1}$.cm$^{-2}$ at 4200 kg.m$^{-2}$.

Crosslinking of Microporous Matrix (a) Batch process

Samples of the microporous matrix described, each 7 cm by 7 cm, were impregnated by immersion in solution. Formulations of eight solutions are set out below in Table 1 (proportions given by weight):

TABLE 1

| Sample Number | 1 | 2 | 3 | 4 | 5 | 6 | 7 | 8 |
|---|---|---|---|---|---|---|---|---|
| Toluene (SPR Grade, supplied by BDH) | — | — | 97.0 | — | 99.5 | — | 91.5 | 89.0 |
| Acetone (SPR Grade supplied by BDH) | — | 97.0 | 3.0 | 99.5 | — | 91.5 | — | — |
| TAIC (PERKALINK 301 supplied by Akzo Chemie) (triallyl cyanurate crosslinking agent) | — | — | — | — | — | 5.0 | 5.0 | — |
| Divinyl benzene (55% mixture of isomers supplied by Aldrich) | — | — | — | — | — | — | — | 8.0 |

The impregnated matrices were then irradiated on one side for either five or ten minutes under a 15.4 cm 500 watt parallel beam, medium pressure mercury vapor lamp (Hanovia Type UVS 500). The distance between the lamp and the matrix was about 30 cm. After irradiation, the samples were washed in acetone and then dried in an air oven at 60° C. The gel content of each of the irradiated matrices as determined according ASTM D2765-84, and are set out in Table 2 below:

TABLE 2

| SAMPLE NUMBER | Gel content (irradiation time) | |
|---|---|---|
|  | 5 mins | 10 mins |
| 1 | 0.0 | 0.0 |
| 2 | 17.0 | 19.3 |
| 3 | 7.3 | 16.1 |
| 4 | 17.9 | 30.1 |

TABLE 2-continued

| SAMPLE NUMBER | Gel content (irradiation time) | |
|---|---|---|
|  | 5 mins | 10 mins |
| 5 | 13.0 | 24.7 |
| 6 | 4.9 | 8.7 |
| 7 | 4.7 | 10.6 |
| 8 | — | 11.1 |

(b) Continuous process

A continuous length of the microporous matrix was passed through a transfer roll system which impregnated the matrix with a solution of 0.5% by weight benzophenone in acetone. The matrix then passed continuously between two parallel water cooled medium pressure mercury vapor UV lamps (manufactured by Ultraviolet Products Ltd), which irradiated the film simultaneously on both sides. Each lamp and the matrix could be adjusted between 15 cm and 30 cm, the lamps producing a parallel beam approximately 10 cm wide. The speed with which the matrix passes through the transfer roll system and the UV lamps could be adjusted up to 5 meters.min$^{-1}$. After passing through the lamps, the matrix was collected on a spool.

Using this continuous irradiation procedure, lengths of the matrix were crosslinked under a variety of conditions set out in Table 3 below. Also shown in Table 3 are the gel contents obtained with each set of conditions, measured according to ASTM D2765-84:

TABLE 3

| Film speed (m · min$^{-1}$) | Lamp distance to film (cm) | Lamp power (W · cm$^{-1}$) | Gel content (%) |
|---|---|---|---|
| 1.2 | 30 | 120 | 38.4 |
| 1.2 | 30 | 80 | 30.2 |
| 1.2 | 30 | 60 | 22.2 |
| 2.0 | 30 | 60 | 23.1 |
| 2.0 | 22.5 | 60 | 32.8 |
| 2.0 | 19 | 60 | 47.5 |
| 1.0 | 15 | 120 | 74.8 |
| 1.6 | 15 | 120 | 66.4 |
| 2.0 | 15 | 120 | 72.3 |
| 2.0 | 15 | 80 | 63.6 |
| 2.0 | 15 | 60 | 60.1 |
| 3.0 | 15 | 60 | 29.1 |
| 4.0 | 15 | 60 | 22.1 |
| 5.0 | 15 | 60 | 16.7 |

(c) Effect of Crosslinking

The physical properties of the polyethylene microporous matrix were compared before and after crosslinking. The results of the comparison are set out below in table 4:

TABLE 4

|  | Uncrosslinked | Crosslinked |
|---|---|---|
| Gel Content | 0 | 63 |
| Thickness (μm) | 41.5 | 40.5 |
| Air Flow (cm$^3$ · min$^{-1}$ · cm$^{-2}$) | 48 | 44 |
| Porosity (%) | 51.8 | 50.7 |
| Transverse Tensile Strength (N · m$^{-1}$ at 24° C.) | 210 ± 12 | 248 ± 3 |
| Transverse Elongation (%) | 500 ± 60 | 115 ± 30 |

Concentration of Photoinitiator

The optimum concentration of photoinitiator for crosslinking the material of the matrix was determined by preparing acetone solutions containing between 0.25% and 5.0% by weight benzophenone. These solutions were then used to prepare crosslinked matrices using the batch process described above. In this study, each side of each of the matrices was irradiated for five minutes. The gel contents of the resulting matrix's were measured and are set out in Table 5 below and in the accompanying FIG. 1:

TABLE 5

| Benzophenone Concentration (%) | Gel Content (%) |
|---|---|
| 0 | 0 |
| 0.1 | 16.6 |
| 0.25 | 37.6 |
| 0.50 | 53.3 |
| 0.75 | 55.9 |
| 1.0 | 52.9 |
| 1.5 | 54.5 |
| 2.0 | 45.9 |
| 3.0 | 29.2 |
| 5.0 | 19.1 |

Effect of Irradiation Time

The effect of irradiation time on the degree of crosslinking (as measure by gel content) was determined by preparing an acetone solution containing 0.5% by weight benzophenone. This solution was then used to prepare crosslinked matrices according to the procedure described above. Table 6 below and the accompanying FIG. 2 show the effect of irradiation time on the degree of crosslinking:

TABLE 6

| Irradiation time (minutes each side) | Gel Content (%) |
|---|---|
| 1 | 2.3 |
| 2 | 13.2 |
| 4 | 40.3 |
| 8 | 59.8 |
| 10 | 57.5 |
| 15 | 62.5 |
| 20 | 63.2 |

Production of Electrode Separator (a) Two-stage process

An electrode separator was prepared from a microporous polyethylene matrix which had been crosslinked to a gel content of 58 to 63% using the continuous process described above (film fee 2.0 meters.min$^{-1}$), distance from lamp to film 15 cm, lamp power 80 W cm$^{-1}$, distance from lamp to film 15 cm, lamp power 80 W.cm$^{-1}$. The matrix was impregnated continuously at a rate of 2 meters.min$^{-1}$ on a transfer roll system with a solution having the following composition (all amounts percent by weight):

| Acrylic acid | 53.6% |
|---|---|
| Divinyl benzene (55% active-Aldrich) | 4.4% |
| Benzildimethylketal (IRAGACURE photoinitiator 651 ™) | 2.2% |
| Nonionic surfactant (LUTENSOL ON 70 ™) | 6.0% |
| Potassium hydroxide pellets | 12.3% |
| Water | 21.5% |

Once impregnated with this solution, the matrix was passed between two parallel water cooled medium pressure mercury vapor UV lamps to cause the acrylic acid within the pores of the matrix to polymerize and to react with the divinyl benzene. The distance between each of the lamps and the matrix was about 30 cm, and the power of each lamp was about 60 W.cm$^{-1}$. The matrix was then passed through a tank containing 5% by weight potassium hydroxide at 65° C. in order to convert the polymerized acrylic acid into its potassium salt form. Finally, the matrix was passed through a series of tanks containing deionized water, and dried over heated rollers at 80° C.

The electrode separator so produced was strong and flexible, and had a thickness of 40 μm. Table 7 compares the characteristics of the crosslinked separator with a separator prepared using a non-crosslinked matrix. These characteristics were determined according to the methods described in "Characteristics of Separators for Alkaline Silver -Oxide Secondary Batteries" AD 447301 US Air Force Manual:

TABLE 7

|  | Non-crosslinked | Crosslinked |
|---|---|---|
| Gel Content (%) | 0 | 58–63 |
| Thickness (μm) | 41 | 40 |
| Moisture Content (%) | 17.6 | 18.3 |
| Resistance (ohm · cm$^2$ at 24° C.) | 0.210 | 0.286 |
| Swelling (%) |  |  |
| Length | −1.5 | −1.7 |
| Width | +8.0 | +9.8 |
| Thickness | +73.2 | +56.1 |
| Volume | +84.2 | +69.0 |
| Electrolyte Absorbtion (%) | 118.9 | 96.4 |
| Acrylic Acid Content (% dry H$^+$ form) | 42.1 | 42.5 |
| Stability in 40% w/w KOH at 71° (% weight loss after 28 days) | 2.1 | 2.3 |
| Transverse Tensile Strength (N · m$^{-1}$ at 24° C.) | 283 ± 20 | 272 ± 30 |
| Transverse Elongation (% at 24° C.) | 520 ± 100 | 209 ± 50 |
| Silver Barrier (layers penetrated) | 5 | 3 |
| Silver Barrier (Ag$^+$ in third layer) | 27 | 11 |

The barrier characteristics to silver ions were determined in two ways as follows: five layers of the electrode separator, each 12 mm by 30 mm, were soaked with a non-woven polypropylene absorber (300 μm thick) of the same size in 40% by weight potassium hydroxide at 60° C. for 24 hours. The layers were then assembled in a laminated construction as shown in the accompanying drawing as a stack on a flat surface with polypropylene absorber at the bottom. A glass tube, 6 mm internal diameter, was clamped on top of the six layer stack, using a rubber O-ring to make a liquid tight seal between the top separator and the tube. An amount of 4 cc of 40% by weight potassium hydroxide was then supplied to the tube, which was then sealed and placed in an air oven at 60° C. for 2 hours. Silver oxide (Ag$_2$O) was then added to cover the top surface of the stack completely. The tube was then resealed, and the assembly returned to the oven at 60° C. for 24 hours. The potassium hydroxide and excess solid were then carefully removed and the tube was disassembled. The five separators were then separated, washed with deionized water, and allowed to dry in air. Each layer was visually inspected to determine the number of separator layers which had been penetrated by silver (which appeared as brown coloration). A smaller number of penetrated layers indicated better barrier performance.

The barrier characteristics to silver ions were also determined by measuring the content of the ions of the third of the separator layers from the stack referred to above, using atomic absorption techniques.

(b) Continuous process

An electrode separator was produced in a continuous process using two pairs of ultraviolet lamps, a first pair to initiate crosslinking of the polyethylene of the matrix, and the second pair to initiate crosslinking and polymerization of acrylic acid impregnant. It has been found that the properties of electrode separators made using the batch and continuous process follow one another closely.

COMPARATIVE EXAMPLE

An electrode separator was produced using the microporous polyethylene matrix and the two stage process referred to above. The composition of the impregnant solution was as follows:

| Acrylic Acid | 50.8% |
|---|---|
| Divinylbenzene | 8.3% |
| Benzildimethylketal | 2.2% |
| Nonionic Surfactant | 10.0% |
| Potassium hydroxide pellets | 11.7% |
| Water | 17.0% |

Compared with the products prepared by the two-stage process described above, the product prepared in this example differs in that the mole ration of divinyl benzene crosslinking agent to acrylic acid is approximately doubled; as a result, the crosslink density in the acrylic acid will also be increased significantly.

The electrode separator so produced had the following properties:

TABLE 8

| Gel Content (%) | 0 |
|---|---|
| Thickness (micrometers) | 45 |
| Moisture content (%) | 15.7 |
| Resistance at 24° C. (ohm · cm$^2$ in 40% w/w KOH) | 0.410 |
| Swelling (%) | |
| Length | −0.6 |
| Width | +5.4 |
| Thickness | +30.0 |
| Volume | +36.2 |
| Electrolyte Absorption (%) | 74.5 |
| Acrylic Acid Content (% dry H$^+$ form) | 32.3 |
| Stability in 40% w/w KOH at 71° C. (% weight loss after 28 days) | 1.4 |
| Silver Barrier (layers penetrated) | 4 to 5 |
| Silver Barrier (Ag$^+$ in 3rd layer) | 20 |

From a comparison of the two sets of data in Table 7 with the date in Table 8, it can be seen that crosslinking of the polyethylene matrix has the advantageous combined result of providing a highly effective barrier to silver ions, comparable with that obtained in the comparative example in which the concentration of crosslinking agent (and therefore also the crosslink density) in the acrylic acid is doubled. However, in addition to this barrier property, the resistance to ionic conduction through the membrane by an ion exchange mechanism is maintained at a level significantly lower thorn is obtained by increasing the crosslink density in the acrylic acid.

Grafted Surface Layer

A length of microporous polyethylene film of thickness 30 μm was coated with a photoinitiator by passing the film through a solution consisting of 0.5% by weight benzophenone in acetone, and then allowing the solvent to evaporate. This sensitized film was then passed through the a solution of acrylic acid having the following composition, using a transfer roll system at a speed of 2 m.min$^{-1}$:

| Acrylic acid | 25% |
|---|---|
| Potassium hydroxide pellets (85% assay) | 11.5% |
| Copper sulphate (CuSO$_4$.5H$_2$O) | 0.1% |
| Non-ionic surfactant (LUTENSOL ON70 TM) | 3.0% |
| Water | 60.4% |

In this solution, half of the acrylic acid monomer is converted potassium acrylate by the potassium hydroxide and the copper sulphate is present as a homopolymerization inhibitor. Other such homopolymerization inhibitors can be used, such as the iron (II) salts or the copper (II) salts, preferably iron (II) sulphate.

The grafting and crosslinking reactions were initiated simultaneously by passing the impregnated film between two mercury vapor lamps at a speed of 2m.min$^{-1}$. The distance between each lamp and the film was 15 cm, and the power of the lamps was varied to determine the effect on the graft level and the degree of crosslinking. The grafted film was then washed in dilute hydrochloric acid, and then deionized water, in order to remove traces of unreacted monomer, residual copper ions, etc, and then dried in air at 60° C. The gel content of the film was determined by refluxing in toluene whilst the acrylic acid content (that is, the graft level) was calculated by an ion exchange method using potassium hydroxide.. The results for each ultraviolet lamp power setting are set out below in Table 9:

TABLE 9

| Power (W · cm$^{-1}$) | % Gel | % Graft |
|---|---|---|
| 60 | 51.8 | 0.7 |
| 80 | 62.4 | 1.7 |
| 120 | 78.9 | 4.0 |

An electrode separator was prepared from a polyethylene film of thickness 30 μm, to which a quantity of acrylic acid had been co-polymerized in the manner described above. This film was impregnated continuously at a speed of 2m.min$^{-1}$ on a transfer roll system with a solution of the following composition:

| Acrylic acid | 53.6% |
|---|---|
| Divinyl benzene | 4.4% |
| Benzildimethylketal (IRAGACURE 651 TM) | 2.2% |
| Non-ionic surfactant (LUTENSOL ON70 TM) | 6.0% |
| Potassium hydroxide pellets | 12.3% |
| Water | 21.5% |

The impregnated film was then passed between two mercury vapor lamps positioned 30 cm from the film, whose power output had been set at 60 W.cm$^{-1}$. After the curing step, the film was washed in 5% potassium hydroxide at 65° C., and then washed again in deionized water. The film was then dried over heated rollers at 80° C. A length of polyethylene film thickness 30 μm which had not been crosslinked or subjected to the grafting treatment was also converted into an electrode separator membrane in the manner described above.

The characteristics of these two types of separator are set out in Table 10 below:

TABLE 10

|  | Ungrafted | Grafted |
|---|---|---|
| Gel content (%) | 0 | 78.9 |
| Graft level (%) | 0 | 4.0 |
| Thickness ($\mu$m) | 28.0 | 28.5 |
| Resistance (ohm · cm$^2$) | 207 | 293 |
| Swelling (%) |  |  |
| Length | −1.5 | −1.0 |
| Width | +5.0 | +6.7 |
| Thickness | +82.1 | +58.9 |
| Volume | +88.4 | +67.8 |
| Electrolyte absorption (%) | 110.0 | 90.6 |
| Acrylic acid content (% dry H$^+$ form) | 37.1 | 34.3 |
| Transverse tensile strength (N · m$^{-1}$ at 24° C.) | 258 | 278 |
| Transverse elongation (% at 24° C.) | 181 | 183 |
| Silver barrier (layers penetrated) | 7 to 8 | 4 to 5 |

It is found that the separator which is provided with the layer of grafted polyacrylic acid is wetted by an aqueous electrolyte more quickly than the separator without that feature. Quicker wetting with electrolyte has the advantage that the characteristic internal resistance of a cell in which the separator is used is reached more quickly, allowing the cell to be tested more quickly prior to use.

We claim:

1. A composite polymer membrane comprising a first polymeric material which defines a microporous matrix, and a second polymeric material which at least partially fills, and thereby blocks, the pores of the matrix, and wherein at least said first polymeric material is crosslinked.

2. A membrane as claimed in claim 1, in which said second polymeric material formed from a vinyl monomer reacts directly or indirectly with an acid or a base to form a salt which is graft-polymerized with said first polymeric material.

3. A membrane as claimed in claim 2, in which the second polymeric material comprises a polymer of an ethylenically unsaturated acid or an ester thereof.

4. A membrane as claimed in claim 2, in which the second polymeric material in the pores of the microporous matrix and the vinyl monomer on the surface of the matrix are derived from the same monomer material.

5. A membrane as claimed in claim 1, in which said first polymeric material is a polyolefin.

6. A membrane as claimed in claim 1, said microporous matrix having a structure resulting from the formation of a film from a blend of the first polymeric material and a pore forming material which defines the pores followed by removal of said pore forming material from the film.

7. A membrane as claimed in claim 1, in which the volume of the membrane occupied by said pores is at least about 10%.

8. A membrane as claimed in claim 7, in which the volume of the membrane occupied by the pores is at least about 30%.

9. A membrane as claimed in claim 1, in which the proportion of the volume of said pores within the microporous matrix of the first polymeric material which is filled by the second polymeric material is at least about 20%.

10. A membrane as claimed in claim 9, wherein the proportion of the volume of the pores within the microporous matrix of the first polymeric material which is filled by said second polymeric material is at least about 75%.

11. A membrane as claimed in claim 9, wherein the proportion of the volume of the pores within the microporous matrix of the first polymeric material which is filled by said second polymeric material is at least about 95%.

12. A membrane as claimed in claim 1, having a thickness of less than 250 $\mu$m.

13. A membrane as claimed claim 12 having a thickness of less than 200 $\mu$m.

14. A membrane as claimed in claim 12 having a thickness of less than 100 $\mu$m.

15. A membrane as claimed in claim 1 wherein both said first and second polymeric materials are crosslinked.

16. A method of making a composite polymer membrane, which comprises:
   (a) providing a microporous matrix comprising a first polymeric material impregnated with a first reagent which is capable of crosslinking said first polymeric material;
   (b) causing the first polymeric material and the first reagent to react to crosslink the first polymeric material; and
   (c) impregnating the microporous matrix with a curable second material.

17. A method as claimed in claim 16, wherein said impregnating of said second material into the microporous matrix as a component of a mixture with a second reagent which is capable of crosslinking said second material, said method including the step of causing the second material to react with the second reagent to crosslink said second material.

18. A method as claimed in claim 17, wherein said crosslinking of at least one of said first and second materials is initiated by irradiation.

19. A method as claimed in claim 18, wherein said irradiation comprises ultraviolet irradiation.

20. A method as claimed in claim 16, wherein said second material is impregnated in the pores of the microporous matrix of the first polymeric material in a solution.

21. A method as claimed in claim 16, including the step of forming the microporous matrix of the first polymeric material by removing a pore forming material therefrom.

22. A method as claimed in claim 16, including the step of graft copolymerizing a vinyl monomer which reacts directly or indirectly, with an acid or a base to form a salt with said first polymeric material on the surface of the microporous matrix.

23. A method as claimed in claim 22, wherein said vinyl monomer is applied to the surface of the microporous matrix in a solution, the solution including a component for inhibiting the homopolymerization of said monomer.

24. A method as claimed in claim 23, wherein said component for inhibiting the homopolymerization of said monomer is an iron (II) salt or a copper (II) salt.

25. A method as claimed in claim 24 wherein said homopolymerization inhibitor comprises iron (II) sulphate.

26. A method of crosslinking a polymeric material in the form of a microporous matrix, said polymeric material comprising a polyolefin, which comprises:
  (a) impregnating the matrix with a solution of reagent in a solvent which is capable crosslinking said polymeric material;
  (b) volatilizing said solvent in which the reagent is dissolved; and
  (c) crosslinking said polymeric material.

27. A method as claimed in claim 26, including initiating said crosslinking reaction by exposure of the impregnated microporous matrix to ultraviolet radiation.

28. A method as claimed in claim 26 or claim 27, in which the material of the polymer matrix is polyethylene.

29. An electrochemical device which comprises an anode, a cathode, a liquid electrolyte, and an electrode separator comprising a composite polymer membrane comprising a first polymeric material which defines a microporous matrix, and a second polymeric material which at least partially fills, and thereby blocks, the pores of said matrix, and wherein at least said first polymeric material is crosslinked.

* * * * *

UNITED STATES PATENT AND TRADEMARK OFFICE
CERTIFICATE OF CORRECTION

PATENT NO. : 5,425,865

DATED : June 20, 1995

INVENTOR(S) : Raymond W. Singleton, John A. Cook, Kenneth Gargan

It is certified that error appears in the above-identified patent and that said Letters Patent is hereby corrected as shown below:

Column 1, line 39, delete ";".
Column 3, line 37, after "invention" insert --,--;
after "therefore" insert --,--;
line 39, delete "So" and insert therefor --to--;
line 46, after "will", insert --,--;
line 47, after "therefore", insert --,--;
line 48, delete "-".
Column 5, line 52, "Shape" should read --shape--.
line 55, delete "the" (second occurrence) and insert therefor --time--.
Column 9, line 48, after "W" insert --.--.
Column 10, line 15 delete "-".
Column 11, line 62, after "and", insert --,--;
after "therefore", insert --,--;
line 66, delete "thorn" and insert therefor --than--.
Column 12, line 56, "IRAGACURE" should read --IRGACURE--.
Column 14, line 26, delete "is capable of crosslinking" and insert therefor --crosslinks--.
line 36, delete "is capable of crosslinking" and insert therefor --crosslinks--.
Column 15, line 5, delete "is capable crosslinking" and insert therefor --crosslinks--.

Signed and Sealed this

Twenty-sixth Day of September, 1995

Attest:

BRUCE LEHMAN

Attesting Officer     Commissioner of Patents and Trademarks